US012708899B2

(12) United States Patent
Amassian et al.

(10) Patent No.: US 12,708,899 B2
(45) Date of Patent: Aug. 18, 2026

(54) DUAL UV-Vis REFLECTANCE ABSORBANCE AND PHOTOLUMINESCENCE MODULES

(71) Applicant: North Carolina State University, Raleigh, NC (US)

(72) Inventors: Aram Amassian, Raleigh, NC (US); Nathaniel R. Woodward, Raleigh, NC (US); Mihirsinh Chauhan, Raleigh, NC (US); Boyu Guo, Raleigh, NC (US)

(73) Assignee: North Carolina State University, Raleigh, NC (US)

( * ) Notice: Subject to any disclaimer, the term of this patent is extended or adjusted under 35 U.S.C. 154(b) by 547 days.

(21) Appl. No.: 18/236,226

(22) Filed: Aug. 21, 2023

(65) Prior Publication Data

US 2024/0246075 A1 Jul. 25, 2024

Related U.S. Application Data

(60) Provisional application No. 63/399,517, filed on Aug. 19, 2022.

(51) Int. Cl.
*B01L 3/00* (2006.01)

(52) U.S. Cl.
CPC . *B01L 3/502715* (2013.01); *B01L 2300/0609* (2013.01); *B01L 2300/0654* (2013.01); *B01L 2300/0851* (2013.01); *B01L 2300/168* (2013.01)

(58) Field of Classification Search
CPC ..... B01L 2300/0609; B01L 2300/0654; B01L 2300/0851; B01L 2300/168; B01L 3/502715; G01N 2021/475; G01N 2021/6484; G01N 21/31; G01N 21/474; G01N 21/645; G01N 21/8422; G01N 2201/08
See application file for complete search history.

(56) References Cited

U.S. PATENT DOCUMENTS

| | | | | |
|---|---|---|---|---|
| 2007/0064228 | A1* | 3/2007 | Tartakovsky | G01J 3/4406 250/461.1 |
| 2022/0034795 | A1* | 2/2022 | Takahashi | G01N 21/33 |
| 2023/0249173 | A1 | 8/2023 | Amassian et al. | |
| 2024/0226950 | A1 | 7/2024 | Amassian et al. | |

* cited by examiner

*Primary Examiner* — Jennifer Wecker
*Assistant Examiner* — Jonathan Bortoli
(74) *Attorney, Agent, or Firm* — Jenkins, Taylor & Hunt, P.A.

(57) ABSTRACT

Devices, systems, and methods for characterizing material samples. In one aspect, a device for characterizing a sample includes a substrate configured for receiving a sample thereon; an optical fiber probe comprising a first end positioned near the sample and a second end that is bifurcated to include one or more first fiber configured for connection to a first light emitting device and one or more second fiber configured for connection to a spectrometer; a reflectance module coupled to the substrate; and a second light emitting device positioned near the sample. The optical fiber probe is configured for selectively obtaining at the spectrometer both a reflectance absorbance measurement of the sample associated with the first light emitting device and a photoluminescence measurement of the sample associated with the second light emitting device.

13 Claims, 7 Drawing Sheets

DUAL UV-Vis REFLECTANCE ABSORBANCE AND PHOTOLUMINESCENCE MODULES

PRIORITY CLAIM

This application claims the priority benefit of U.S. Provisional Patent Application Ser. No. 63/399,517, filed Aug. 19, 2022, the disclosure of which is incorporated herein by reference in its entirety.

GOVERNMENT INTEREST

This invention was made with government support under grant number N00014-20-1-2573 awarded by the Office of Naval Research and under grant number CBET1934351 awarded by the National Science Foundation. The government has certain rights in the invention.

TECHNICAL FIELD

The subject matter disclosed herein relates generally to systems and methods for optical characterizing and inspection of a sample. More particularly, the subject matter disclosed herein relates to systems and methods for characterizing reflectance absorbance and photoluminescence of a material sample.

BACKGROUND

Characterizing a material sample using absorption/reflectance spectroscopy and fluorescence spectroscopy conventionally requires that such characterizations be performed one at a time using separate dedicated benchtop instruments or combined again using very large optical tables. It would be advantageous for systems and methods for such material characterization to be available using less space, time, and cost to perform the analysis.

SUMMARY

In accordance with this disclosure, devices, systems, and methods for characterizing material samples are provided. In one aspect, a device for characterizing a sample includes a substrate configured for receiving a sample thereon; an optical fiber probe comprising a first end positioned near the sample and a second end that is bifurcated to include one or more first fiber configured for connection to a first light emitting device and one or more second fiber configured for connection to a spectrometer; a reflectance module coupled to the substrate; and a second light emitting device positioned near the sample. The optical fiber probe is configured for selectively obtaining at the spectrometer both a reflectance absorbance measurement of the sample associated with the first light emitting device and a photoluminescence measurement of the sample associated with the second light emitting device.

In another aspect, a method for characterizing a sample includes positioning a sample on a substrate; positioning a first end of an optical fiber probe near the sample, wherein a second end of the optical fiber probe opposite the first end is bifurcated to include one or more first fiber and one or more second fiber; connecting the one or more first fiber to a first light emitting device; connecting the one or more second fiber to a spectrometer; coupling a reflectance module to the substrate; positioning a second light emitting device near the sample; selectively activating the first light emitting device to obtain at the spectrometer a reflectance absorbance measurement of the sample; and selectively activating the second light emitting device to obtain at the spectrometer a photoluminescence measurement of the sample.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

Although some of the aspects of the subject matter disclosed herein have been stated hereinabove, and which are achieved in whole or in part by the presently disclosed subject matter, other aspects will become evident as the description proceeds when taken in connection with the accompanying drawings as best described hereinbelow.

DETAILED DESCRIPTION

Figure 1:
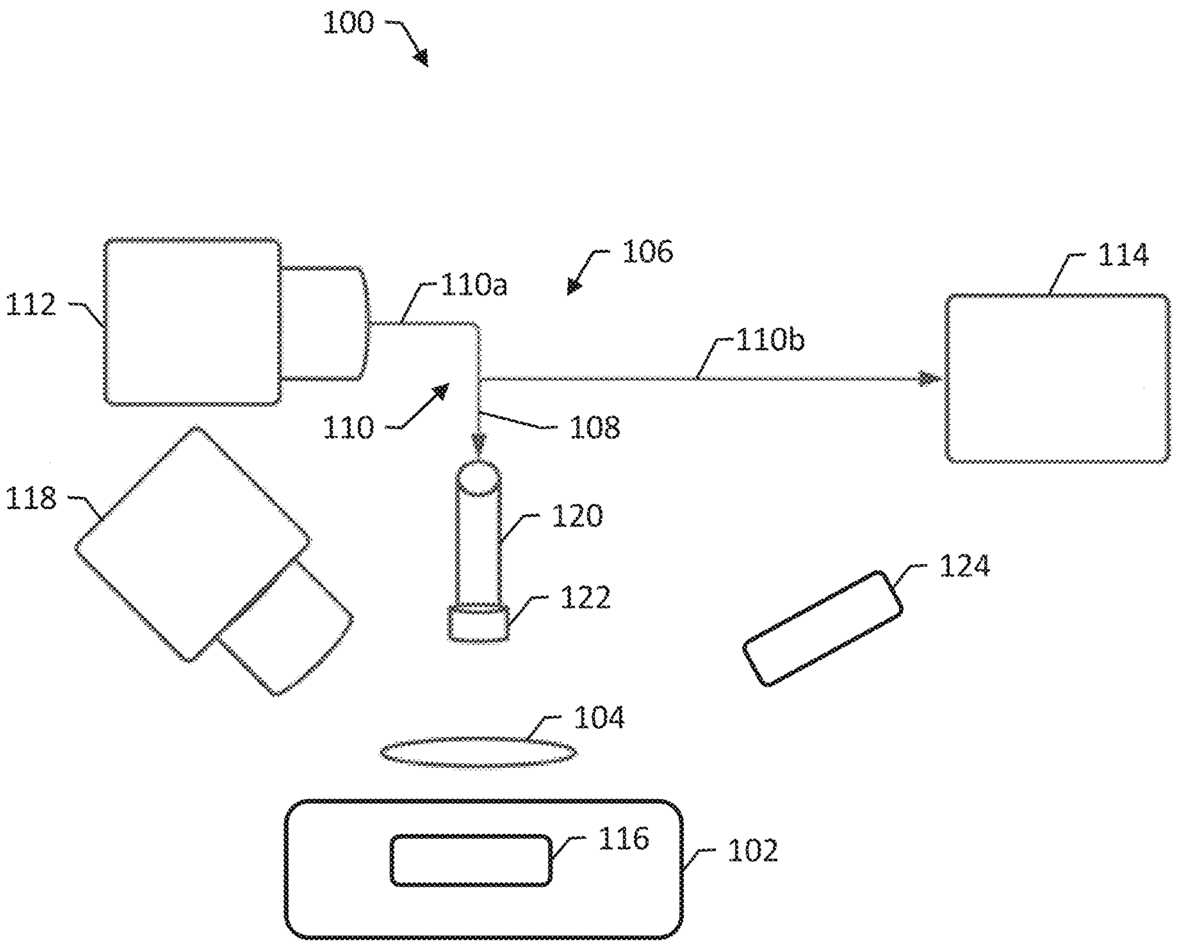
FIG. 1 is a block diagram of an example device for characterization of samples.

The present subject matter provides systems and methods for a dual UV-Vis reflectance absorbance and modular photoluminescence in-situ and ex-situ characterization. A substrate is provided on which a sample can be received. The sample can include any sample as would be apparent to one of ordinary skill in the art upon a review of the instant disclosure, such as but not limited to, a thin film, a bulk surface, a bulk material, a biological material, a solid-state material, or any combination thereof. In some embodiments, for example, the substrate is mounted on a rotating element of a spin coater device. A single bifurcated fiber is used for standard reflectance measurement, with one fiber for light input and the second fiber returning the output to a CMOS spectrometer. In some embodiments, the first light emitting device is a broadband light source configured to produce light in wavelengths within the UV-Vis region of the electromagnetic spectrum.

In addition, a reflectance module is coupled to the substrate, such as by being screwed onto a custom-built spinner. In some embodiments, the reflectance measurement is taken off-center to allow for continuous in-situ measurement even with dynamic dispensing of solution during the spin coating process (this is the region of great interest that is almost always interrupted when an in-situ measurement is performed with manual pipetting).

A second modular attachment to the spin coater can include a second light emitting device that is coupled to the substrate and/or otherwise positioned near the sample. In some embodiments, the second light emitting device allows for swappable LEDs for photoluminescence measurements in-which the specific wavelength used is dictated by the material being testing. Photoluminescence measurements make use of the same output fiber as the reflectance measurements take as to make use of only a single spectrometer (absorbance and photoluminescence measurements cannot be taken at the same time as they would interfere with each other). Both the first light emitting device (e.g., UV-Vis) and the second light emitting device (e.g., photoluminescence light source) can be computer-controlled to enable alternating measurements. In some embodiments, the light sources and spectrometer are integrated into a graphical user interface for spin coating in which a user can specify in-situ (during the experiment) or ex-situ (only at the end of the experiment) along with if they want absorbance, photoluminescence, or both. The graphical user interface can also display the measurements in real time. In some embodiments, the baseline measurements, raw measurements, and calculated values are saved along with a log of the experimental inputs and the exact timing.

To enable the dual measurements with the same sensor, the photoluminescence and reflection light sources can be switched on and off alternatively to prevent interference. The computer system is programmed to turn one light source on and the other light source off at a specific frequency to enable dual measurements from the same spectrometer.

In this way, whereas existing approaches can only perform such characterizations one at a time using separate dedicated benchtop instruments or combined again using very large optical tables, the presently disclosed subject matter integrates both characterization techniques into a single probe. Such a configuration can reduce the space, time, and cost to perform the analysis.

In addition, in some embodiments, samples can be subject to further characterizations, including optical and/or electron microscopy, Raman microscopy, x-ray diffraction, electrical characterization, Grazing-Incidence Wide-Angle X-ray Scattering (GIWAXS), and the like.

In some embodiments, the characterization data can further be used to construct a database, either locally or on the cloud, to enable data analytics and visualization. In addition, in some embodiments, the characterization data can be used to guide future experiments manually, automatically, semi-autonomously, or autonomously by applying statistical, machine-learning, or artificial intelligence algorithms. Examples of such experiments can include uncertainty quantification, feature extraction, intelligent exploration of parameter space, exploitation and multi-parameter optimization, closed-loop experimentation with decision making under uncertainty, and semi-autonomous and autonomous experimentation.

FIG. 1 is a block diagram of an example device 100 for characterization of samples. The device 100 includes a substrate 102 configured for receiving a sample 104 thereon. The device 100 is configured for characterizing the sample 104.

The device 100 includes an optical fiber probe 106 having a first end 108 positioned near the sample 104 and a second end 110 that is bifurcated to include one or more first fibers 110*a* configured for connection to a first light emitting device 112 and one or more second fibers 110*b* configured for connection to a spectrometer 114. The device 100 includes a reflectance module 116 coupled to the substrate 102 and a second light emitting device 118 positioned near the sample 104. In some examples, the substrate 102 itself is reflective, for example, using a Si wafer. In other examples, the reflectance module 116 comprises, e.g., a coupled silver coated glass.

The optical fiber probe 106 is configured for selectively obtaining, at the spectrometer 114, both a reflectance absorbance measurement of the sample 104 associated with the first light emitting device 112 and a photoluminescence measurement of the sample 104 associated with the second light emitting device 114.

In some examples, the substrate 102 is mounted on a rotating element of a spin coater device, and the reflectance module 116 is attached to the rotating element. The sample 104 can be, e.g., a thin film, a bulk surface, a bulk material, a biological material, a solid-state material, or any combination thereof.

The first light emitting device 112 can be a broadband light source configured to produce light in wavelengths within the UV-Vis region of the electromagnetic spectrum. The second light emitting device can be adjustable to emit light having multiple excitation wavelengths.

In some examples, the device 100 includes a controller in communication with the first light emitting device 112 and the second light emitting device 118 for controlling activation of the first light emitting device 112 and the second light emitting device 118. The device 100 can include a graphical user interface configured to display the reflectance absorbance measurement and the photoluminescence measurement in real time.

The device 100 can include a fiber probe holder 120 and a filter 122. The filter 122 can be, e.g., a 400 nm optical filter. The fiber probe holder 120 is situated to orient the optical fiber probe 106 to an appropriate viewing position with respect to the sample 104. The probe 106 can be very close to the substrate 102; in some examples, the probe 106 is further away from the substrate 102 using a collimator lens (e.g., built into the holder 120). The filter 122 is optional depending on the material and experiment being conducted.

In general, the device 100 can be used for diffuse or specular reflectance from solids; fluorescence; color. The fibers in the optical fiber probe 106 can be high OH UV-Visible fibers (e.g., 300-1100 nm). In some examples, the optical fiber probe 106 includes a 6-around-1 fiber bundle design, with a six fiber leg connecting to the light source 112 and a single-fiber leg connecting to the spectrometer 114. Other numbers of fibers can be used as appropriate.

In some examples, the device 100 includes a camera 124 configured for capturing one or more images of the sample 104 during an experiment. The camera 124 can be configured to transmit the images, e.g., to a user computer, for display to technician or for supplying the images to a machine learning algorithm.

Figure 2A:
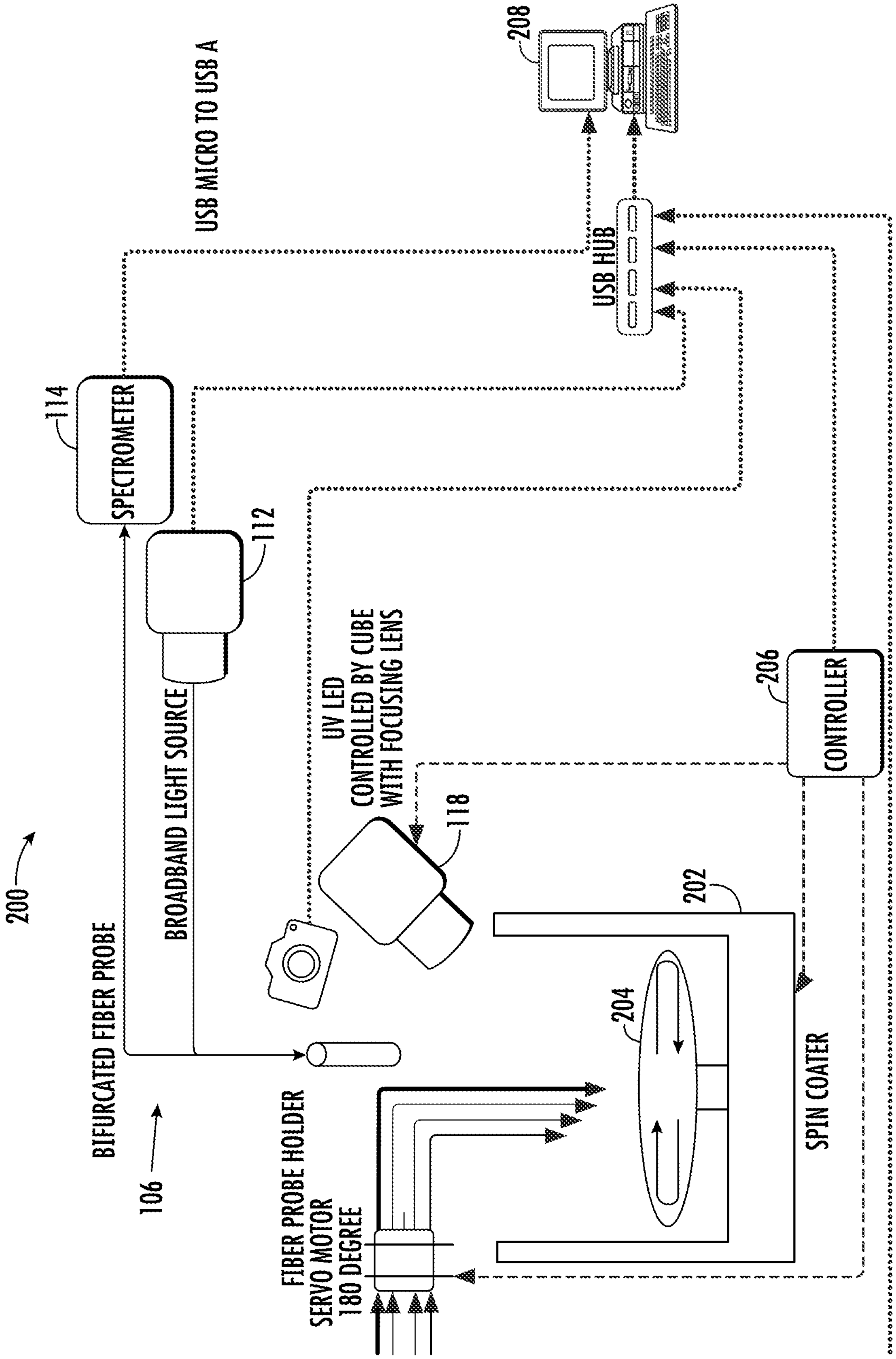
FIG. 2A is a block diagram of an example characterization system.

FIG. 2A is a block diagram of an example characterization system 200 including the device 100 of FIG. 1. FIG. 2A illustrates a spin coater device 202; the substrate 102 can be mounted on a rotating element 204 of the spin coater device 202. The reflectance module 116 can also be attached to the rotating element 204.

The system 200 includes a controller 206 configured for controlling activation of the light emitting devices 112 and 118. The controller 206 can be, e.g., a microcontroller or other appropriate computing device. The system 200 also includes a user computer 208 which can include a graphical user interface configured to display reflectance absorbance measurements and photoluminescence measurements, e.g., in real time.

Figure 2B:
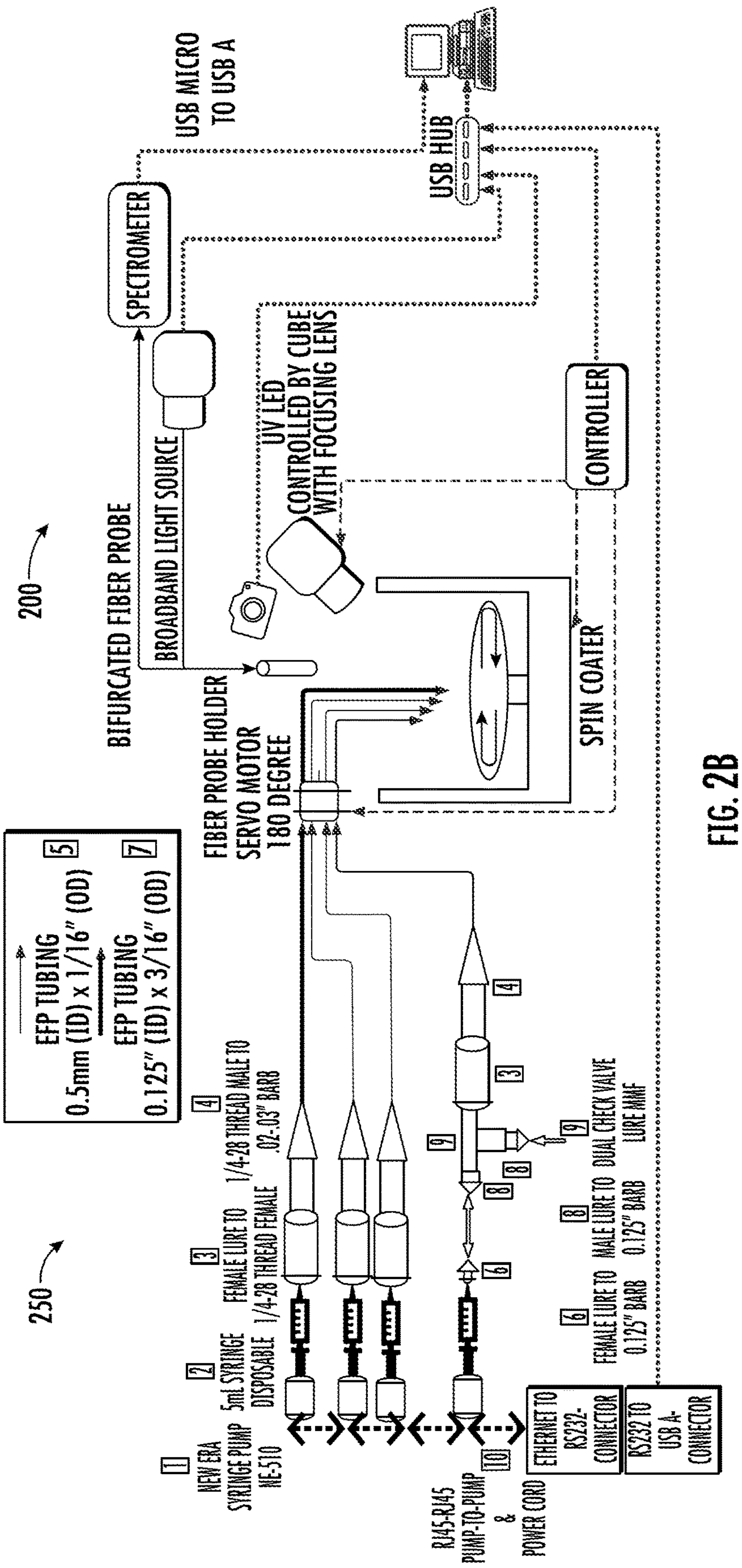
FIG. 2B is a block diagram of a platform for characterization including the characterization system.

FIG. 2B is a block diagram of a platform for characterization including the characterization system 200 of FIG. 2A and a sample deposition system 250 configured for loading the sample 104 onto the spin coater device 202 for characterization. The sample deposition system 250 can include, for example, a plurality of electronically controllable syringe pumps, appropriate tubing, and a servo motor controlled by the controller 206.

Figure 3:
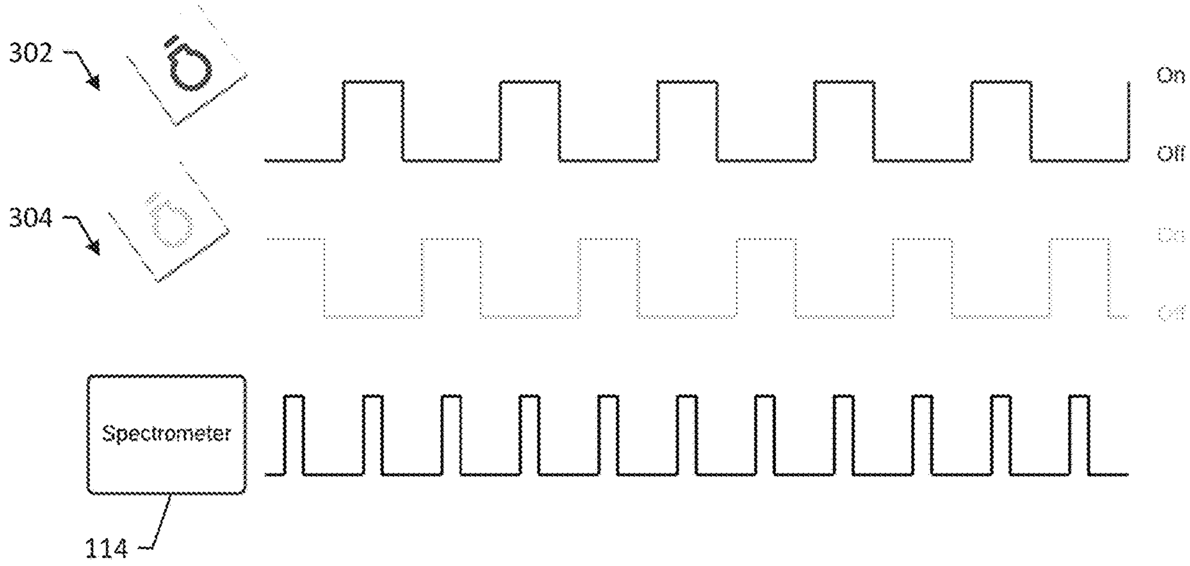
FIG. 3 is a waveform diagram showing a first waveform of UV for photoluminescence, a second waveform for a broadband LED, and the spectrometer.

FIG. 3 is a waveform diagram showing a first waveform 302 of UV for photoluminescence, a second waveform 304 for a broadband LED, and the spectrometer 114.

The device 100 can include one or more of the following characterization add-ons, which can be used in-situ and ex-situ:

- Camera configured for capturing photographs or videos of the process
- Reflectance measurements:
  - Absorbance and optical thickness measurements
    - UV-Vis light source
    - Spectrometer
    - Bifurcated fiber probe
- Photoluminescence
  - Provides band gap and relative quantum yield measurements
    - Add appropriate low-wavelength LED For the photoluminescence light source, any appropriate light producing technology can be used. For example, an LED or a laser diode can be used. For the photoluminescence quantum yield (PLQY), this value can be calculated from the combined measurements of both UV-Vis absorbance and photoluminescence.

Figure 4A:
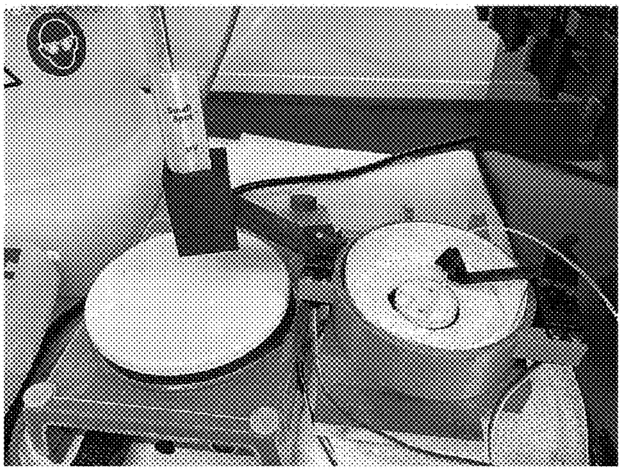
FIG. 4A is picture of an example implementation of the device where the probe is rotatable from spinner to over hotplate.
Figure 4B:
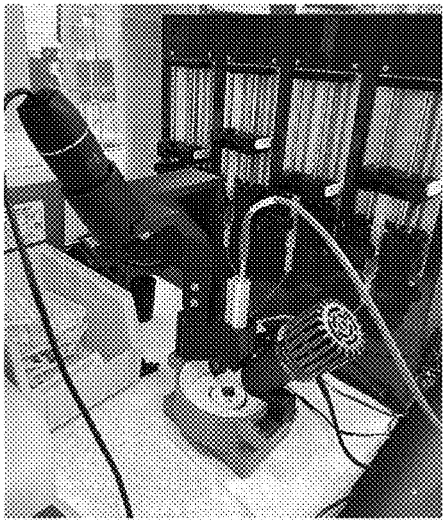
FIG. 4B is a picture of an example implementation of the device in a stationary probe setup.
Figure 4C:
FIG. 4C is a picture of an example implementation showing the broader platform of the system.

The device 100 can optionally have a movable measurement probe or a stationary probe setup. The probe could also be attached at, e.g., a 3 or more axis arm. FIG. 4A is picture of an example implementation of the device 100 where the probe is rotatable from spinner to over hotplate. FIG. 4B is a picture of an example implementation of the device 100 in a stationary probe setup. FIG. 4C is a picture of an example implementation showing the broader platform of the system.

Figure 5:
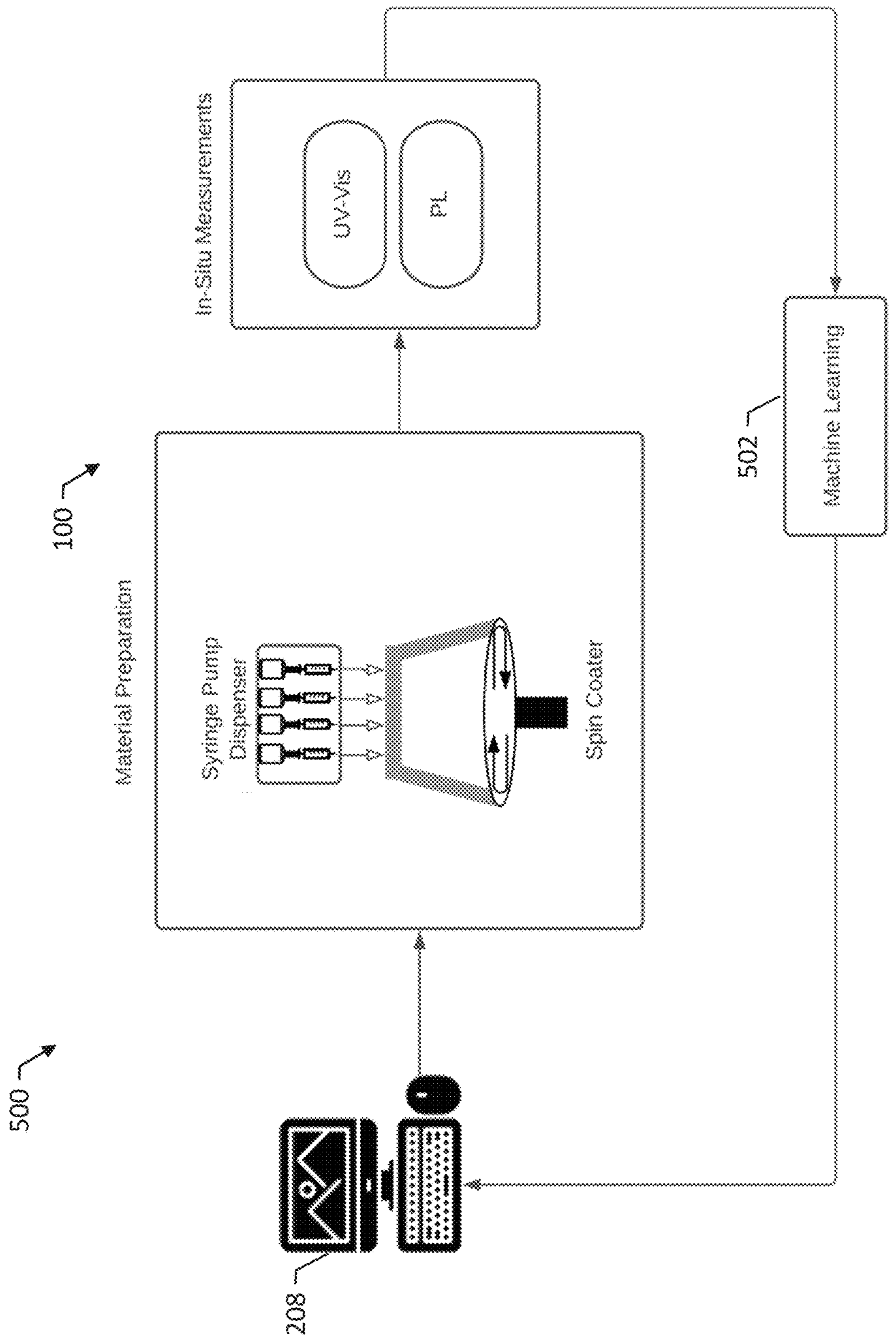
FIG. 5 is a block diagram of a system that incorporates the device and a machine learning module.

The device 100 can be used in a wide range of use cases, for example:

- OPV thin-film in-situ study
- OPV device fabrication
- Perovskite thin-film in-situ study
- Perovskite device fabrication
- Perovskite Quantum Dot fabrication
- In-Line GIWAXs in-situ study
- Ex-Situ characterization FIG. 5 is a block diagram of a system 500 that incorporates the device 100 and a machine learning module 502. The machine learning module 502 can be implemented on a system of one or more computers configured for receiving training data (e.g., from the device 100 and optionally other sources) and producing a machine learning model for characterizing samples, e.g., which can be reported on the user computer 208.

In some examples, the system 500 uses active learning. The system 500 can be configured for taking measurements in-line using the same computer system 208. This enables the desired values to be extracted from the measurement and applied to one of various appropriate machine learning algorithms in an integrated platform to then run the next experiment. This can be useful, e.g., to avoid having to go to another characterization platform to run different experiments.

In some examples, the system 500 uses a camera to capture one or more images during an experiment. The system 500 can apply machine vision (ML/DNN) in an active learning campaign using the images captured from the camera.

Figure 6:
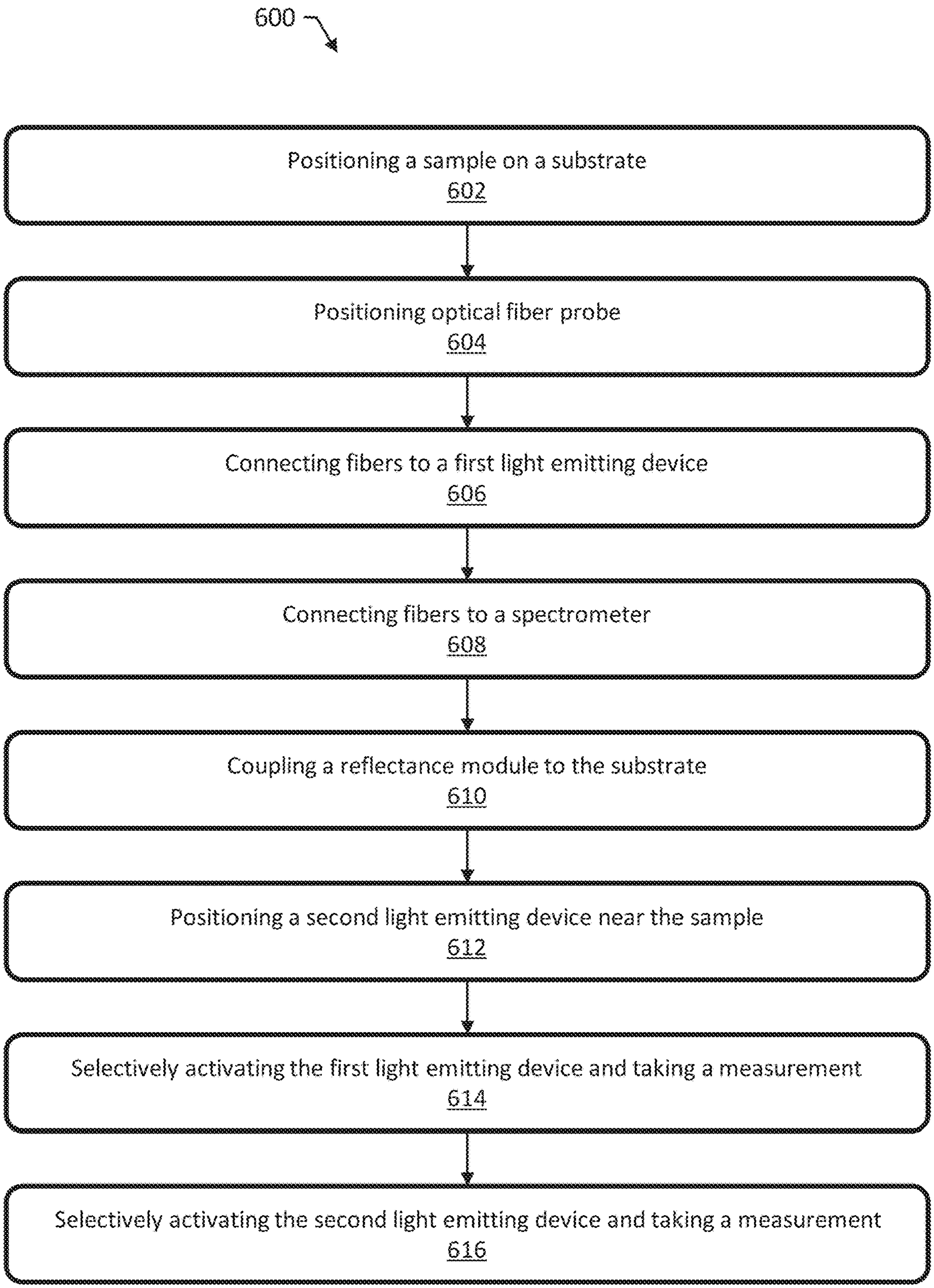
FIG. 6 is a flow diagram of an example method for characterizing a sample.

FIG. 6 is a flow diagram of an example method 600 for characterizing a sample.

The method 600 includes positioning a sample on a substrate (602). The method 600 includes positioning a first end of an optical fiber probe near the sample (604). A second end of the optical fiber probe opposite the first end is bifurcated to include one or more first fibers and one or more second fibers.

The method 600 includes connecting the one or more first fibers to a first light emitting device (606). The method 600 includes connecting the one or more second fibers to a spectrometer (608).

The method 600 includes coupling a reflectance module to the substrate (610). The method 600 includes positioning a second light emitting device near the sample (612). In some examples, both photoluminescence and reflectance are built into the same mount, which enables both to be moved.

The method 600 includes selectively activating the first light emitting device to obtain, at the spectrometer, a reflectance absorbance measurement of the sample (614). The method 600 includes selectively activating the second light emitting device to obtain, at the spectrometer, a photoluminescence measurement of the sample (616).

Selectively activating the second light emitting device can include adjusting a wavelength of the second light emitting device to correspond to the sample. Selectively activating the first light emitting device and selectively activating the second light emitting device can include alternately activating the first light emitting device and the second light emitting device. Selectively activating the first light emitting device and selectively activating the second light emitting device can include characterizing the sample during an experiment in-situ.

In some examples, the substrate is mounted on a rotating element of a spin coater device. The reflectance module can be, e.g., screwed onto the rotating element, or mounted to a multi axis robotic arm. The sample can be a thin film, a bulk surface, a bulk material, a biological material, a solid-state material, or any combination thereof.

The method 600 can include displaying the reflectance absorbance measurement and the photoluminescence measurement in real time. One or both of the reflectance absorbance measurement and the photoluminescence measurement can be assigned (e.g., by a user computer) to uniquely identified samples as characterization data.

The method 600 can include constructing a database of the characterization data, either locally or on the cloud, to enable data analytics and visualization. The method 600 can include using the characterization data to guide one or more experiments manually, automatically, semi-autonomously, or autonomously by applying statistical, machine-learning, or artificial intelligence algorithms. The one or more experiments can be selected from the group consisting of uncertainty quantification, feature extraction, intelligent exploration of parameter space, exploitation and multi-parameter optimization, closed-loop experimentation with decision making under uncertainty, and semi-autonomous and autonomous experimentation.

Unless defined otherwise, all technical and scientific terms used herein have the same meaning as commonly understood to one having ordinary skill in the art to which the presently disclosed subject matter belongs. Although, any methods, devices, and materials similar or equivalent to those described herein can be used in the practice or testing of the presently disclosed subject matter, representative methods, devices, and materials are now described.

Following long-standing patent law convention, the terms “a”, “an”, and “the” refer to “one or more” when used in this application, including the claims. Thus, for example, reference to “a vial” can include a plurality of such vials, and so forth.

Unless otherwise indicated, all numbers expressing quantities of length, diameter, width, and so forth used in the specification and claims are to be understood as being modified in all instances by the terms “about” or “approximately”. Accordingly, unless indicated to the contrary, the numerical parameters set forth in this specification and attached claims are approximations that can vary depending upon the desired properties sought to be obtained by the presently disclosed subject matter.

As used herein, the terms “about” and “approximately,” when referring to a value or to a length, width, diameter, temperature, time, volume, concentration, percentage, etc., is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate for the disclosed apparatuses and devices.

As used herein, ranges can be expressed as from “about” one particular value, and/or to “about” another particular value. It is also understood that there are a number of values disclosed herein, and that each value is also herein disclosed as “about” that particular value in addition to the value itself. For example, if the value “10” is disclosed, then “about 10” is also disclosed. It is also understood that each unit between two particular units are also disclosed. For example, if 10 and 15 are disclosed, then 11, 12, 13, and 14 are also disclosed.

The term “comprising”, which is synonymous with “including” “containing” or “characterized by” is inclusive or open-ended and does not exclude additional, unrecited elements or method steps. “Comprising” is a term of art used in claim language which means that the named elements are essential, but other elements can be added and still form a construct within the scope of the claim.

As used herein, the phrase “consisting of” excludes any element, step, or ingredient not specified in the claim. When the phrase “consists of” appears in a clause of the body of a claim, rather than immediately following the preamble, it limits only the element set forth in that clause; other elements are not excluded from the claim as a whole.

As used herein, the phrase “consisting essentially of” limits the scope of a claim to the specified materials or steps, plus those that do not materially affect the basic and novel characteristic(s) of the claimed subject matter.

With respect to the terms “comprising”, “consisting of”, and “consisting essentially of”, where one of these three terms is used herein, the presently disclosed and claimed subject matter can include the use of either of the other two terms.

As used herein, the term “and/or” when used in the context of a listing of entities, refers to the entities being present singly or in combination. Thus, for example, the phrase “A, B, C, and/or D” includes A, B, C, and D individually, but also includes any and all combinations and sub-combinations of A, B, C, and D.

The presently disclosed subject matter can be embodied in other forms without departure from the spirit and essential characteristics thereof. The embodiments described therefore are to be considered in all respects as illustrative and not restrictive. Although the present subject matter has been described in terms of certain preferred embodiments, other embodiments that are apparent to those of ordinary skill in the art are also within the scope of the present subject matter.

What is claimed is:

1. A device for characterizing a sample, the device comprising:

a substrate configured to hold a sample;

a reflectance module coupled to the substrate;

a first light emitting device configured to emit a first light;

a second light emitting device configured to emit a second light directly towards the substrate;

a spectrometer; and an optical fiber probe comprising a first end proximal to the substrate and a second end bifurcating into a first branch and a second branch, the first branch comprising at least one first optical fiber configured to optically couple to the first light emitting device and the second branch comprising at least one second optical fiber configured to optically couple to the spectrometer; wherein the optical fiber probe is configured to transmit to the spectrometer:

(i) a first signal corresponding to a reflectance absorbance measurement of the sample using the first light emitted by the first light emitting device; and (ii) a second signal corresponding to a photoluminescence measurement of the sample using the second light emitted by the second light emitting device.

2. The device of claim 1, further comprising a spin coater device comprising a rotating element wherein the substrate is mounted on the rotating element and the reflectance module is attached to the rotating element.

3. The device of claim 1, further comprising a camera configured to capture one or more images of the sample, wherein the sample is one from the group consisting of a thin film, a bulk surface, a bulk material, a biological material, and a solid-state material, or a combination thereof.

4. The device of claim 1, wherein the first light emitting device comprises a broadband light source configured to emit the first light as ultraviolet light and visible light.

5. The device of claim 1, wherein the second light emitting device is a tunable light source.

6. The device of claim 1, further comprising a controller in communication with the first light emitting device and with the second light emitting device, the controller programmed to enable dual measurements by the spectrometer by activating the first light emitting device without activating the second light emitting device and by activating the second light emitting device without activating the first light emitting device.

7. The device of claim 1, further comprising a graphical user interface configured to display, in real time, the reflectance absorbance measurement and the photoluminescence measurement.

8. A method of characterizing a sample using the device of claim 1, the method comprising:

positioning a sample on the substrate;

positioning the first end of the optical fiber probe near the sample;

connecting the at least one first fiber to the first light emitting device;

connecting the at least one second fiber to the spectrometer;

positioning the second light emitting device near the sample;

transmitting to the spectrometer the first signal by activating the first light emitting device;

transmitting to the spectrometer the second signal by activating the second emitting device; and charactering the sample using the spectrometer.

9. The method of claim 8, wherein the substrate is mounted on a rotating element of a spin coater device.

10. The method of claim 9, wherein the reflectance module is screwed onto the rotating element.

11. The method of claim 8, further comprising activating the first light emitting device a second time and activating the second light emitting device a second time.

12. The method of claim 8, further comprising displaying, in real time, the reflectance absorbance measurement and the photoluminescence measurement.

13. The method of claim 8, wherein the sample is selected from the group consisting of a thin film, a bulk surface, a bulk material, a biological material, and a solid-state material, or a combination thereof.

* * * * *